April 7, 1953 J. R. DAVEY 2,634,333
TELEGRAPH HUB REPEATER CIRCUIT
Filed Sept. 15, 1949
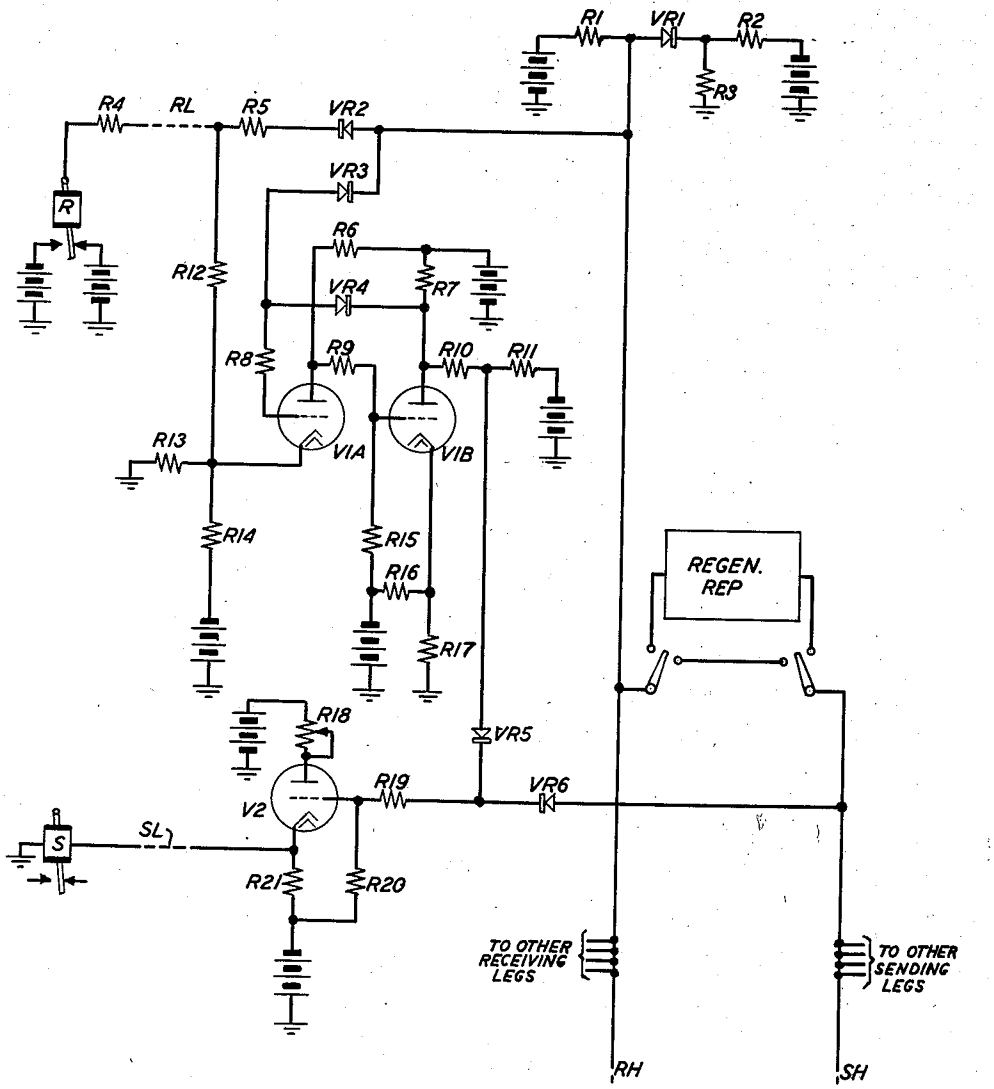
INVENTOR
J. R. DAVEY
BY John E. Cassidy
ATTORNEY Patented Apr. 7, 1953 2,634,333

UNITED STATES PATENT OFFICE 2,634,333

TELEGRAPH HUB REPEATER CIRCUIT

James R. Davey, New York, N. Y., assignor to Bell Telephone Laboratories, Incorporated, New York, N. Y., a corporation of New York Application September 15, 1949, Serial No. 115,849

7 Claims. (Cl. 178—73)

This invention is an improved telegraph repeater of the hub type. Hub-type telegraph repeaters are well known in the art being described for instance in Patent 2,347,813 issued to G. C. Cummings, May 2, 1944.

An object of the invention is the improvement of hub telegraph repeaters.

The improvement consists essentially in the introduction of a non-linear voltage polarity discriminating resistance element generally well known as, and called hereinafter a varistor, in the hub potentiometer to improve the signaling conditions and the operating margins. It has been found difficult heretofore in connection with other proposed hub-type repeaters to obtain a satisfactory relationship between the available spacing signaling voltage from the receiving terminal repeater and the voltage variation produced at the hub point. The hub point in these previous arrangements was terminated in a linear resistance network known as the hub potentiometer. In the present arrangement an improvement is achieved in the effect of the hub potentiometer by inserting a varistor therein, which as a result of its well-known property of discrimination in the passage of current dependent upon the polarity of the potential applied to its terminals for the marking, spacing and double space conditions affords an improvement in operating margins and in signaling.

Hub-type repeaters are now being proposed which do not employ magnetic relays either alone or in combination with space discharge devices, but employ space discharge devices only to perform all functions. Such hub-type repeaters will be connected into hub repeater concentrations to which are also connected hub repeaters which employ magnetic relays as does the present repeater to receive signals and transmit them toward the hub. When a space discharge device such as a vacuum tube is employed to perform the switching function heretofore performed by the magnetic polar-type receiving relay, it is not feasible, with present tubes, to transmit negative 130-volt signals for spacing, toward the hub, for whereas a magnetic relay is a perfect switch and can transmit whatever potentials may be supplied to its armature through its opposed contacts, a space discharge device can only approximate the switching function of a magnetic relay. If, for instance, positive 130 volts is connected through a resistance to its anode and the cathode is connected to negative 130-volt battery, it is feasible to obtain say negative 105 volts at its anode for impression on the receiving hub as a spacing signal. It is desirable therefore in hub repeaters employing a magnetic relay as the receiving device which transmits toward the hub to employ potentials corresponding to those which can be obtained from the discharge device when it is employed as the receiving device in other repeaters operating with the same hub concentration.

In the present arrangement therefore a magnetic relay is employed as a receiving device for a hub repeater and the marking and spacing potentials supplied through it are made the same as those which can be obtained from presently obtainable space discharge devices performing the same function in other repeaters with which the magnetic repeater cooperates in the same hub concentration. For instance, in the present arrangement, positive 130 volts potential is applied through the marking contact of the receiving relay for the marking condition and negative 105 volts is applied through its spacing contact for the spacing condition to the hub to match the potentials obtained through space discharge devices in cooperating repeaters.

In the present arrangement for the marking condition positive 130 volts is impressed through the marking contact of the receiving relay and positive 60 volts is impressed on the receiving hub by the hub potentiometer. A varistor employed in the receiving leg is so poled that it is substantially non-conducting. The potential applied to the receiving hub is due to the hub potentiometer alone. A varistor employed in the hub potentiometer is in the conducting condition due to a proper choice of the magnitudes of the potentiometer elements. When the armature of the receiving relay is actuated to spacing, negative 105 volts is applied through its spacing contact. The varistor in the receiving leg is in the low resistance condition and the receiving hub potential becomes negative 30 volts. The varistor in the hub potentiometer assumes its high resistance condition. The voltage swing of the hub is greater than would be possible if the hub potentiometer varistor were not employed. Without the varistor a spacing voltage of —120 volts would be required from the receiving relay to produce the same hub voltage variations.

The employment of a varistor in the hub potentiometer also affords more uniform impedance conditions for signaling and makes the wave forms of the signals produced in the receiving hub more symmetrical thus improving the signaling. As presently arranged for the marking condition the impedance of each receiving leg is effectively disconnected due to the non-conductance of a varistor in each leg. For this condition, however, resistance elements are effectively connected in the hub potentiometer circuit due to the conducting condition of a varistor therein. For the spacing condition the receiving leg varistor becomes conducting, effectively substituting the impedance of the leg for the impedance of the effectively disconnected elements in the hub potentiometer. Thus the two varistors cooperate to form an equalizing impedance switch for the two signaling conditions. The hub voltage at which the varistor in the hub potentiometer changes its resistance from high to low and vice versa may be selected by properly proportioning resistors in the hub potentiometer.

The foregoing may be understood from the following description when read with reference to the drawing which shows a preferred embodiment in which the invention is presently incorporated. It is to be understood, however, that the invention may be incorporated in other embodiments which will be readily suggested by the following to those skilled in the art.

In the following the potential magnitudes are for a typical case but it is to be understood that the invention is not so limited.

The drawing shows the hub-type repeater of the present invention. It is assumed that a number of such circuits are connected together at the RH and SH leads, a common potentiometer comprising varistors VR1, R1, R2 and R3 being provided on the RH lead. When a regenerative telegraph repeater is provided, the input of the regenerator unit is connected to the RH lead and the output of the regenerator is connected to the SH lead. In this case signals on the SH lead have the same conditions for mark and space as those on the RH lead but are delayed by one-half to one pulse length from those appearing on the RH lead. When a regenerator is not provided the RH lead is directly connected to the SH lead.

Assuming that the armatures of all R relays have been on their respective marking contacts for some time, the potential of the RH lead is held at +60 volts by the potentiometer comprising varistors VR1, R1, R2 and R3 associated with this lead. At this time all RL leads are at approximately +130 volts so that a reverse potential difference of about 70 volts is applied to varistor VR2, causing them to have high resistance. The cathode of triode V1A has a potential of +20 volts determined by the network consisting of resistances R12, R13 and R14 connecting to the junction of resistances R4 and R5. All tubes V2 are conducting because of direct connection of the SH to the RH hub lead or because the output of the regenerator associated with the SH lead is marking. In the control circuit associated with the R relay which was last operated to the spacing contact, the left-hand triode V1A is conducting and in all other control circuits the right-hand triode V1B is conducting as explained in a following paragraph.

When one of the R relays is operated to the spacing contact the potential difference across varistor VR2 in the associated control circuit is in the forward direction causing a reduction in resistance between the RH lead and the negative spacing battery. This reduced resistance causes the potential of the RH lead to change from the marking condition of +60 volts to a spacing condition of −30 volts. The potential at the junction of resistances R4 and R5 in becoming negative lowers the potential of the cathode of triode V1A to −45 volts. The change in potential of the RH lead is applied to the grid of triode V1A through the potentiometer formed by varistors VR3 and VR4 which are connected in series between the RH lead and the plate of tube V1B. These varistors are connected so that varistor VR3 has low resistance and varistor VR4 has high resistance whenever the RH potential is negative. Consequently almost the full negative potential of the RH lead appears at the junction of VR3 and VR4.

The negative 30-volt potential on the RH lead causes all triodes V1A except the one associated with the R relay which has operated to spacing to become non-conducting. The anodes of these triodes become more positive due to reduction in current flow through resistor R5. This positive condition is applied to the grid of triode V1B through the potentiometer-connected resistors R9 and R15 so that triode V1B becomes conducting and the potential at the plate of V1B drops because of increased current flow through resistor R7. The change in potential at the plate of triode V1B is applied to potentiometer-connected resistors R10 and R11 which are returned to −130-volt battery and so related that when triode V1B is conducting the junction of R10 and R11 is at a potential slightly more negative than the normal spacing potential of the SH lead. This condition in combination with the condition of the SH lead is applied to the grid of tube V2 through the network formed by elements VR5, VR6, R19 and R20.

Varistors VR5 and VR6 are so connected that when the SH lead is in the positive or marking condition varistor VR6 is low resistance and varistor VR5 is high resistance so that the junction of these varistors is positive. This condition is applied to the grid of V2 through potentiometer-connected resistors R19 and R20 which are so related that triode V2 is conducting, causing current to flow in the SL lead in a direction to operate the S relay armature to the marking contact. When the SH lead becomes negative, which occurs at the same time that the RH lead becomes negative unless a regenerative repeater is used, the junction of varistors VR5 and VR6 becomes negative. This negative condition causes triode V2 to cut off. Under this condition current flow through relay S is through resistor R21 and in a direction to operate the armature of relay S to the spacing contact.

When the armature of relay R which has been sending toward the RH hub returns to the marking contact, varistor VR2 in the associated control circuit becomes high in resistance, causing the potential of the RH lead to rise to +60 volts. This potential is applied through the potentiometer formed by varistors VR3 and VR4 to the grid of tube V1A. In control circuits other than the one associated with the repeater in which the R relay is sending toward the hub, the potential at the anode of triode V1B is approximately zero so that with the RH lead positive, varistor VR3 is high resistance and varistor VR4 low resistance. In these control circuits, therefore, triode V1A is held cut off by the anode condition of triode V1B. This is the case since the cathodes of triodes V1A in these circuits are at +20 volts and their grids are controlled by the potential of the anodes of the associated triodes V1B which are at approximately 0 volt. Consequently the potential applied to the grid of triode V2 through varistor VR5 does not change. When the +60-volt marking signal arrives at the SH hub the resistance of varistor VR6 drops and the resistance of varistor VR5 rises so that the marking condition of the SH hub is applied to triode V2 causing it to conduct. Conduction of triode V2 causes the impedance between the SL lead and positive battery to be lowered so that the direction of current in the S relay reverses and the armature of this relay is operated to the marking contact.

In the circuit which is sending toward the hub, changes in the potential of the RH hub lead are applied to the grid of triode V1A as in all other control circuits, but are accompanied by changes in cathode potential due to the connection between the cathode of V1A and the RL lead through the potentiometer formed by resistors R12, R13 and R14. Thus when the potential applied through resistor R3 to the grid of triode V1A is —30 volts, the potential of the cathode is approximately —45 volts which gives a net positive drive of 15 volts on the grid of this tube. This positive drive causes V1A to remain conducting or to become conducting if it had previously been non-conducting. The resulting negative condition at the anode of triode V1A causes triode V1B to remain or become non-conducting so that the potential of the anode of triode V1B remains or becomes positive. This positive condition is applied through resistors R10 and R11 and varistor VR5 to the grid of triode V2. When the spacing signal arrives at the SH hub the potential difference across VR6 is such as to make it high resistance. At the same time the potential difference across VR5 is such as to make it low resistance so that the positive holding voltage through VR5 is the controlling factor in keeping triode V2 conducting. This effect prevents relay S from repeating back toward the originating end of the circuit the signals appearing at the armature of relay R.

When the armature of relay R in the circuit which is transmitting toward the hub returns to the marking contact and the RH potential returns to +60 volts the potential difference across varistors VR3 and VR4 is in a direction to make varistor VR3 low resistance and varistor VR4 high resistance. This is the case because triode V1B in the same circuit, as explained in the last preceding paragraph, is now conducting at this time and due to the reduced flow of current from positive battery through resistance R7, and the proportioning of resistors R7, R10 and R11, the potential of the anode of triode V1B is made more positive than the +60 volts on RH. Consequently the potential applied to the grid of triode V1A through resistor R8 is nearly +60 volts. At the same time the cathode of triode V1A, under control of the RL lead, rises to approximately +20 volts so there is a net positive drive of +40 volts to keep triode V1A in a conducting condition. In this manner the holding condition on triode V2, once set up, is maintained in the last control circuit to send toward the RH hub. As explained in the preceding section this holding condition is removed as soon as another control circuit associated with the same RH lead transmits toward the hub.

Whenever the armatures of two or more R relays associated with the same hub circuit are on the spacing contacts at the same time, the potential of the RH lead falls below the —30-volt normal spacing condition due to the abnormally low impedance between negative spacing battery and the RH potentiometer. This change is facilitated by an increase in resistance of varistor VR1 so that the potential of the RH lead becomes approximately —60 volts when two R relays are simultaneously spacing and somewhat more negative when more than two R relays are spacing at the same time. Since the resistance of varistor VR3 is low under this condition, almost the full negative potential appears on the grid of triode V1A. Since, in the circuits sending toward the hub the cathode potential of triode V1A is approximately —45 volts, this triode is cut off. Because of the interconnection between triodes V1A and V1B, as previously explained, the latter triode becomes conducting and hence the hold on the output triode V2 is released. This allows a spacing condition of the SH hub to be applied to the grids of triode V2 in the circuits causing the multiple space condition, as well as in all other circuits. The sending operators on these circuits are thereby informed that an abnormal condition exists. When a normal condition is restored by all R relays except one returning to a marking condition, the released condition is maintained in all control circuits except the one associated with the last R relay to be in the spacing condition. On this latter control circuit the holding condition is established and, as previously explained, this condition of the control circuits is maintained until some other circuit sends toward the hub.

*Magnitudes of elements*

For a typical case the magnitudes or descriptions of the elements of the circuit are as follows:

| | |
|---|---|
| R1 | 8,800 ohms |
| R2 | 49,500 ohms |
| R3 | 14,840 ohms |
| R4 | 2,000 ohms |
| R5 | 2,170 ohms |
| R6 | 0.47 megohm |
| R7 | 0.1 megohm |
| R8 | 2.2 megohms |
| R9 | 4.7 megohms |
| R10 | 0.56 megohm |
| R11 | 1.8 megohms |
| R12 | 25,000 ohms |
| R13 | 15,000 ohms |
| R14 | 47,000 ohms |
| R15 | 3.9 megohms |
| R16 | 7,500 ohms |
| R17 | 2,200 ohms |
| R18 | 5,000 ohms |
| R19 | 0.27 megohm |
| R20 | 2.4 megohms |
| R21 | 17,000 ohms |
| VR1 | 1 unit germanium |
| VR2 | 4 unit germanium |
| VR3 | 2 unit germanium |
| VR4 | 3 unit germanium |
| VR5 | 2 unit germanium |
| VR6 | 2 unit germanium |

Triode V1A, Triode V1B — 396A twin triode

Triode V2—396A twin triode two halves in parallel.

Potentials 130 v. + or —, as indicated, except spacing contact of R relay which is —105 v.

What is claimed is:

1. A hub-type telegraph repeater having a hub, a hub potentiometer connected directly to said hub, said potentiometer comprising a source of potential connected to a plurality of resistors and a non-linear resistance element, a receiving leg in said repeater, switching means connected to said leg for changing the potential applied to said hub and to said potentiometer for different signaling conditions, the magnitude of said resistors so proportioned that said non-linear resistance changes substantially in impedance responsively, to produce relatively wide swings in potential on said hub.

2. A hub-type telegraph repeater having a sending hub connected to a receiving hub, a hub potentiometer connected directly to said receiving hub, a plurality of impedance elements and a varistor interconnected in said potentiometer, a telegraph signal receiving switch connected to said receiving hub for impressing potential changes on said hub, said elements so proportioned as to responsively increase the effect of said changes on said hubs.

3. A hub-type telegraph repeater, a hub, a receiving leg of said repeater connected to said hub, a hub potentiometer connected to said hub, a first varistor in said potentiometer, a telegraph signal receiving element connected to said hub through said leg, a second varistor in said leg intermediate said element and said hub, positive and negative potential sources connectable through said element to said leg, resistors connected to the opposite terminals of said first varistor in said potentiometer, said resistors so proportioned as to substantially change the impedance of said first varistor responsive to said connection of said sources to increase the potential swings on said hub.

4. In a hub-type telegraph repeater, a circuit path for a first signaling condition extending from a source of potential of a first magnitude and a first polarity, through a switching element, a first resistance, a receiving leg and a first varistor to a receiving hub, said hub connected to a junction between a second resistance element and a second varistor in a hub potentiometer, said potentiometer in a circuit extending from a source of potential of a second magnitude and of said first polarity through said second resistance, said second varistor and a third resistance to ground, the magnitudes of said resistances and of said potential sources such that said first varistor is in its high resistance condition and said second varistor is in its low resistance condition for said first signaling condition, a third source of potential of a polarity opposite from said first and said second sources connectable through said switching element to said path for a second signaling condition, the magnitudes of said sources and of said resistances such that said first varistor is in its low and said second varistor in its high resistance condition for said second signaling condition.

5. A hub-type telegraph repeater having a hub potentiometer connected to a hub, said potentiometer comprising a plurality of resistors connected to opposite terminals of a varistor in said potentiometer and to sources of opposite potential and ground to increase the voltage swings in response to signals incoming to said hub, a telegraph receiving leg connected to said hub, and a signal receiving switch connected to said leg for applying potential changes through said leg on said hub.

6. A hub-type telegraph repeater having a first varistor in a receiving leg and a second varistor in a hub potentiometer, said varistors poled oppositely, said second varistor connected in said potentiometer in a path extending from battery of a first polarity through a first resistor, said second varistor and a second and third resistor in parallel to ground and to battery of a second polarity, respectively, said receiving leg extending from the junction of said first resistor and second varistor through said first varistor, a fourth resistor and a telegraph receiving switch to batteries of opposed polarities.

7. A hub-type telegraph repeater having a first varistor in a receiving leg and a second varistor in a hub-type potentiometer both connected to a hub, sources of potential of different polarities connected through impedance elements and said first varistor directly to said second varistor in said potentiometer, said second varistor inserted between a plurality of resistor elements in said potentiometer, said varistors cooperating to form an impedance switch to improve signal waves impressed on said hub.

JAMES R. DAVEY.

REFERENCES CITED

The following references are of record in the file of this patent:

UNITED STATES PATENTS

| Number | Name | Date |
|---|---|---|
| 2,056,277 | Kinkead | Oct. 6, 1936 |
| 2,528,120 | Davey | Oct. 31, 1950 |